(12) United States Patent
Pulak (10) Patent No.: US 12,017,844 B2
(45) Date of Patent: Jun. 25, 2024

(54) SYSTEM FOR CONTROLLING THE SUPPLY OF WATER TO A ROOFTOP WATER TANK

(71) Applicant: Jana Pulak, Richardson, TX (US)

(72) Inventor: Jana Pulak, Richardson, TX (US)

( * ) Notice: Subject to any disclaimer, the term of this patent is extended or adjusted under 35 U.S.C. 154(b) by 808 days.

(21) Appl. No.: 17/089,904

(22) Filed: Nov. 5, 2020

(65) Prior Publication Data

US 2022/0135317 A1  May 5, 2022

(51) Int. Cl.
| | |
|---|---|
| *B65D 88/54* | (2006.01) |
| *B65D 90/48* | (2006.01) |
| *F04B 23/02* | (2006.01) |
| *F04B 49/02* | (2006.01) |
| *F04B 49/06* | (2006.01) |
| *F04B 49/10* | (2006.01) |
| *F04D 15/02* | (2006.01) |
| *H01H 35/18* | (2006.01) |

(52) U.S. Cl.
CPC .......... *B65D 88/544* (2013.01); *B65D 90/48* (2013.01); *F04B 23/02* (2013.01); *F04B 23/025* (2013.01); *F04B 49/02* (2013.01); *F04B 49/06* (2013.01); *F04B 49/10* (2013.01); *F04D 15/0218* (2013.01); *H01H 35/18* (2013.01); *B65D 2547/00* (2013.01); *B65D 2590/0083* (2013.01); *F04B 2205/09* (2013.01)

(58) Field of Classification Search
CPC ........ B65D 90/48; F04B 23/02; F04B 23/025; F04B 49/02; F04B 49/06; F04B 2205/09; F04D 15/0218; H01H 35/18; G01F 23/00
See application file for complete search history.

(56) References Cited

U.S. PATENT DOCUMENTS

| | | | | |
|---|---|---|---|---|
| 3,656,866 A | * | 4/1972 | Hine, Jr. | F04B 49/022 417/38 |
| 4,180,083 A | * | 12/1979 | Miyaoka | H02J 15/003 137/101.25 |
| 4,437,811 A | * | 3/1984 | Iwata | F04B 49/025 417/40 |
| 4,480,469 A | * | 11/1984 | Tice | H01H 36/02 417/41 |
| 4,999,117 A | * | 3/1991 | Palmu | F04D 15/0088 700/282 |
| 7,309,216 B1 | * | 12/2007 | Spadola, Jr. | F04B 49/02 417/18 |
| 7,417,552 B1 | * | 8/2008 | Vaskovic | G01F 23/802 248/152 |

(Continued)

*Primary Examiner* — Christopher S Bobish
(74) *Attorney, Agent, or Firm* — Baker Botts L.L.P.

(57) ABSTRACT

A system includes first and second sensors, and a controller. The first and second sensors are operable to attach to a water tank that supplies a building with water. The first sensor is configured to determine that a water level in the tank has fallen below a first level. The second sensor is configured to determine that the water level has risen to at least a second level. The controller includes a processor that is communicatively coupled to the sensors. The processor receives, from the first sensor, an indication that the water level has fallen below the first level. In response, the processor generates a signal to activate a pump that delivers water to the tank. The processor additionally receives, from the second sensor, an indication that the water level has risen to at least the second level. In response, the processor generates a signal to deactivate the pump.

20 Claims, 3 Drawing Sheets

(56) References Cited

U.S. PATENT DOCUMENTS

| | | | | |
|---|---|---|---|---|
| 7,668,694 B2* | 2/2010 | Anderson | ................ | G05D 9/12 |
| | | | | 702/182 |
| 8,380,355 B2* | 2/2013 | Mayleben | ............. | G01F 23/268 |
| | | | | 700/282 |
| 8,545,189 B2* | 10/2013 | Venkatachari | ...... | F04D 15/0218 |
| | | | | 417/20 |
| 8,740,574 B2* | 6/2014 | Saukko | ............... | F04D 15/0066 |
| | | | | 417/43 |
| 8,760,089 B2* | 6/2014 | Smith | .................... | H02K 27/04 |
| | | | | 318/785 |
| 9,121,398 B1* | 9/2015 | Al-Nesafi | ............... | F04B 49/02 |
| 9,534,593 B2* | 1/2017 | Cummings | ............. | G01F 23/74 |
| 9,534,606 B2* | 1/2017 | Cummings | ........... | F04D 13/086 |
| 9,574,927 B2* | 2/2017 | Milone | ................. | H01H 35/18 |
| 9,767,975 B1* | 9/2017 | Noel | ..................... | H01H 36/02 |
| 9,879,510 B2* | 1/2018 | Lisk | .................... | E21B 43/128 |
| 10,323,647 B2* | 6/2019 | Grzeika | ................. | G01F 25/22 |
| 11,248,611 B2* | 2/2022 | Hashizume | ............. | F04B 23/04 |
| 11,661,240 B2* | 5/2023 | Schmitz | ................. | F04B 13/00 |
| | | | | 222/23 |
| 2012/0325460 A1* | 12/2012 | Lisk | ................... | F04D 15/0088 |
| | | | | 166/250.01 |
| 2015/0168957 A1* | 6/2015 | Malrait | ............... | F04D 15/0066 |
| | | | | 417/44.1 |
| 2015/0354326 A1* | 12/2015 | Lisk | ........................ | F04D 13/10 |
| | | | | 166/53 |
| 2021/0127609 A1* | 5/2021 | Brake, Jr. | ............. | A01G 31/02 |

\* cited by examiner

SYSTEM FOR CONTROLLING THE SUPPLY OF WATER TO A ROOFTOP WATER TANK

TECHNICAL FIELD

The present disclosure relates generally to rooftop water systems and, more particularly, to controlling the supply of water to a rooftop water tank.

BACKGROUND

Rooftop water tanks may be used to supply buildings with water. In Bangladesh, for example, homes are frequently equipped with rooftop water tanks. In many systems, the only way to know when the tank is out of water is when the water stops flowing out of taps. Pumps must me manually enabled to begin re-filling the water tank and, often, the only way to know when the water tank is full is by the sound of water spilling onto the roof.

SUMMARY

Rooftop water tanks may be used to supply buildings with water. In particular, by placing a building's water supply above the piping that is used to deliver water from the tank to outlet locations within the building (e.g., faucets), water pressure may be established in the building by gravity. In Bangladesh, homes are frequently equipped with rooftop water tanks. These tanks are typically filled with well water that has been pumped into the tank from the ground below. Historically, the process of (1) activating a pump to fill a rooftop water tank with well water and then (2) deactivating the pump once the water tank had been filled, has been a manual one. For example, many homes in Bangladesh are equipped with a light switch installed on a wall of the home that is used to control the operation of the pump; when the water pressure inside the home falls, a resident of the home switches the light switch to the "on" position to activate the pump. Then, once water begins to overflow from the top of the tank, the same or a different resident switches the light switch to the "off" position to deactivate the pump.

Manually operating a water pump in this manner may be undesirable for several reasons. As an example, because the water tank is not automatically refilled when emptied, an individual using water in a home that is equipped with such a system may lose water pressure at undesirable times, such as in the middle of taking a shower or washing dishes. As another example, because the pump does not automatically shut off when the water tank has been refilled, a significant amount of water may be wasted because it overflows out of the tank. Additionally, large amounts of water, regularly overflowing out of the tank may lead to structural damage of the home. Further, as the tank empties, water pressure may be reduced.

This disclosure contemplates an automatic water supply system for a rooftop water tank that is designed to address one or more of the above technical problems. The system includes a pair of water sensors that are in communication with a controller. The sensors are mounted on a structure that may be inserted into a rooftop water tank. One of the sensors is designed to transmit an indication to the controller when the water level inside the tank falls below a minimum fill level. In response to receiving such an indication, the controller activates a water pump which then pumps water into the tank. The second sensor is designed to transmit an indication to the controller when the water level inside the tank reaches and/or rises above a maximum fill level. In response to receiving such an indication, the controller deactivates the water pump.

In certain embodiments, components of the system are designed in a modular fashion, such that they can easily be incorporated into existing rooftop water tank systems (such as, for example, those found in Bangladesh). In particular, the controller is designed to fit within an electrical outlet box (e.g., a box that contains an electrical switch). With this design, installation of the controller in a system that previously included a light switch as a means for manually activating/deactivating a water pump is as simple as replacing the light switch with the automatic controller. Additionally, in some embodiments, the structure on which the sensors are attached is a pole with a hook or other attachment device on one end. With this design, installation of the sensors inside a water tank is as simple as lowering the pole into the tank and hooking the hook of the pole (or otherwise attaching the attachment device) onto the rim of the water tank, to secure the pole in place inside the water tank. In some embodiments, the sensors and the controller are designed to communicate wirelessly with one another, such that there is no need for installation of any communications infrastructure. Certain embodiments of the tool are described below.

According to one embodiment, a system includes a first sensor, a second sensor, and a controller. The first sensor is operable to attach to a water tank that is configured to supply a building with water. The first sensor is configured to determine that a water level in the water tank has fallen below a first level. The second sensor is operable to attach to the water tank. The second sensor is configured to determine that the water level in the water tank has risen to at least a second level. The controller includes a hardware processor that is communicatively coupled to the first sensor and the second sensor. The hardware processor receives, from the first sensor, a first indication that the water level has fallen below the first level. In response to receiving the first indication that the water level has fallen below the first level, the processor generates a first signal to activate a pump that is configured to deliver water to the water tank. The hardware processor additionally receives, from the second sensor, a second indication that the water level has risen to at least the second level. In response to receiving the second indication that the water level has risen to at least the second level, the processor generates a second signal to deactivate the pump.

According to another embodiment, a system includes a pole, a first sensor coupled to the pole, a second sensor coupled to the pole, a third sensor, a database stored in a memory, an interface, and a controller. The pole has a hook at one end. The hook is operable to attach to a rim of a water tank, the water tank being configured to supply a building with water. The first sensor is configured to determine that a water level in the water tank has fallen below a first level. The second sensor is configured to determine that the water level in the water tank has risen to at least a second level. The coupling between the first sensor and the pole and the coupling between the second sensor and the pole are such that the first sensor and the second sensor can be moved on the pole and can be adjusted to different positions on the pole. The third sensor is configured to measure at least one from the set comprising: an amount of water entering the water tank over time and an amount of water leaving the water tank over time. The interface is associated with an application running on a mobile communication device. The interface is configured to receive input from a user and to communicate the input to the controller. The interface is also configured to display output from the controller to the user. The controller is configured to fit within and to couple to an electrical outlet box. The controller is also configured to communicate wirelessly with a pump that is configured to deliver water to the water tank. The controller includes a hardware processor that is communicatively coupled to the first sensor, the second sensor, and the third sensor. The hardware processor receives, from the first sensor, a first indication that the water level has fallen below the first level. In response to receiving the first indication that the water level has fallen below the first level, the processor generates a first signal to activate the pump. The hardware processor also receives, from the second sensor, a second indication that the water level has risen to at least the second level. In response to receiving the second indication that the water level has risen to at least the second level, the processor generates a second signal to deactivate the pump. The hardware processor additionally receives data from the third sensor. The data is associated with at least one of: the amount of water entering the water tank over time and the amount of water leaving the water tank over time. In response to receiving the data from the third sensor, the hardware processor stores the received data in the database in the memory. The hardware processor additionally receives a first communication from the interface. The first communication includes a request for information that includes at least one of: the amount of water entering the water tank over time, the amount of water leaving the water tank over time, and an amount of water remaining in the tank. In response to receiving the first communication from the interface, the hardware processor transmits the information to the interface. In response to receiving the information, the interface displays the information. The hardware processor further receives a second communication from the interface. The second communication includes at least one of: a request to turn the pump on and a request to turn the pump off. In response to receiving the second communication from the interface, the hardware processor generates at least one of a third signal to deactivate the pump and a fourth signal to activate the pump. The processor generates the third signal when the second communication included the request to turn the pump off. The processor generates the fourth signal, when the second communication included the request to turn the pump on.

Certain embodiments provide one or more technical advantages. As an example, an embodiment automatically determines when the water level inside a rooftop water tank has fallen below a minimum fill level and, in response, automatically activates a pump configured to add water to the tank. As another example, an embodiment automatically determines when the water level inside a rooftop water tank has reached and/or passed a maximum fill level and, in response, automatically deactivates a pump that is being used to add water to the tank. As another example, an embodiment enables easy conversion from an existing rooftop water supply system that relies on an individual manually turning on/off a light switch in order to activate/deactivate a water pump, to a system that automatically activates/deactivates the water pump based on the water level in the water tank. In particular, an existing system may be converted into the automatic system of the present disclosure simply by replacing the light switch of the existing system with the disclosed controller (which is designed to fit within the electrical outlet box that housed the light switch) and mounting a structure (e.g., a pole with a hook on one end) to which a pair of water sensors are attached, to the water tank. As a further example, an embodiment enables a user to receive information (for example, the rate of water usage) from the controller and to provide instructions to the controller using an application installed on his/her mobile device. Certain embodiments may include none, some, or all of the above technical advantages. One or more other technical advantages may be readily apparent to one skilled in the art form the figures, descriptions, and claims included herein.

Other objects, features, and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. Furthermore, additional features may be added to any of the specific embodiments described herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1A through 2B of the drawings, like numerals being used for like and corresponding parts of the various drawings.

Figure 1A:
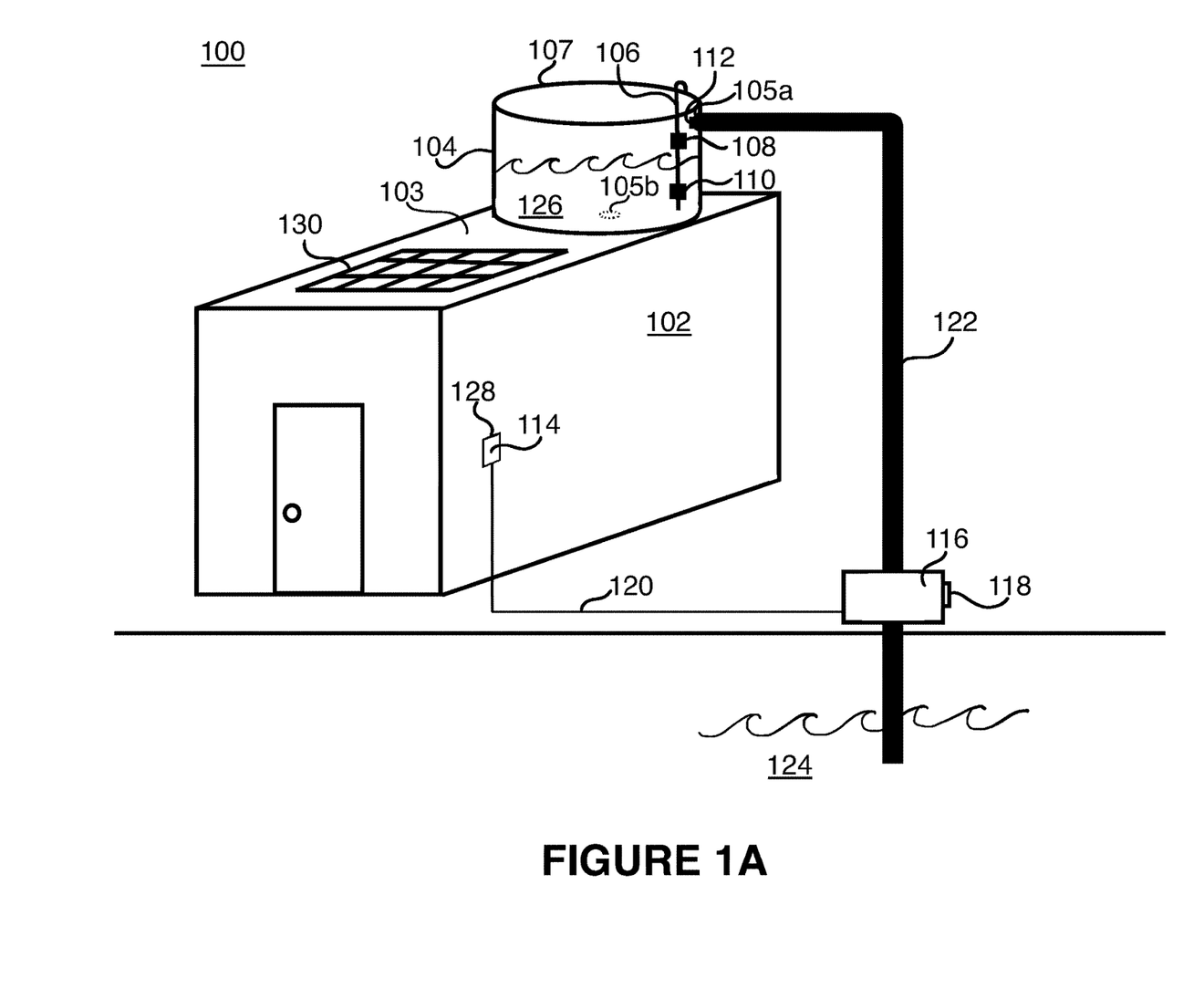
FIGS. 1A and 1B illustrate an example water supply system.
Figure 1B:
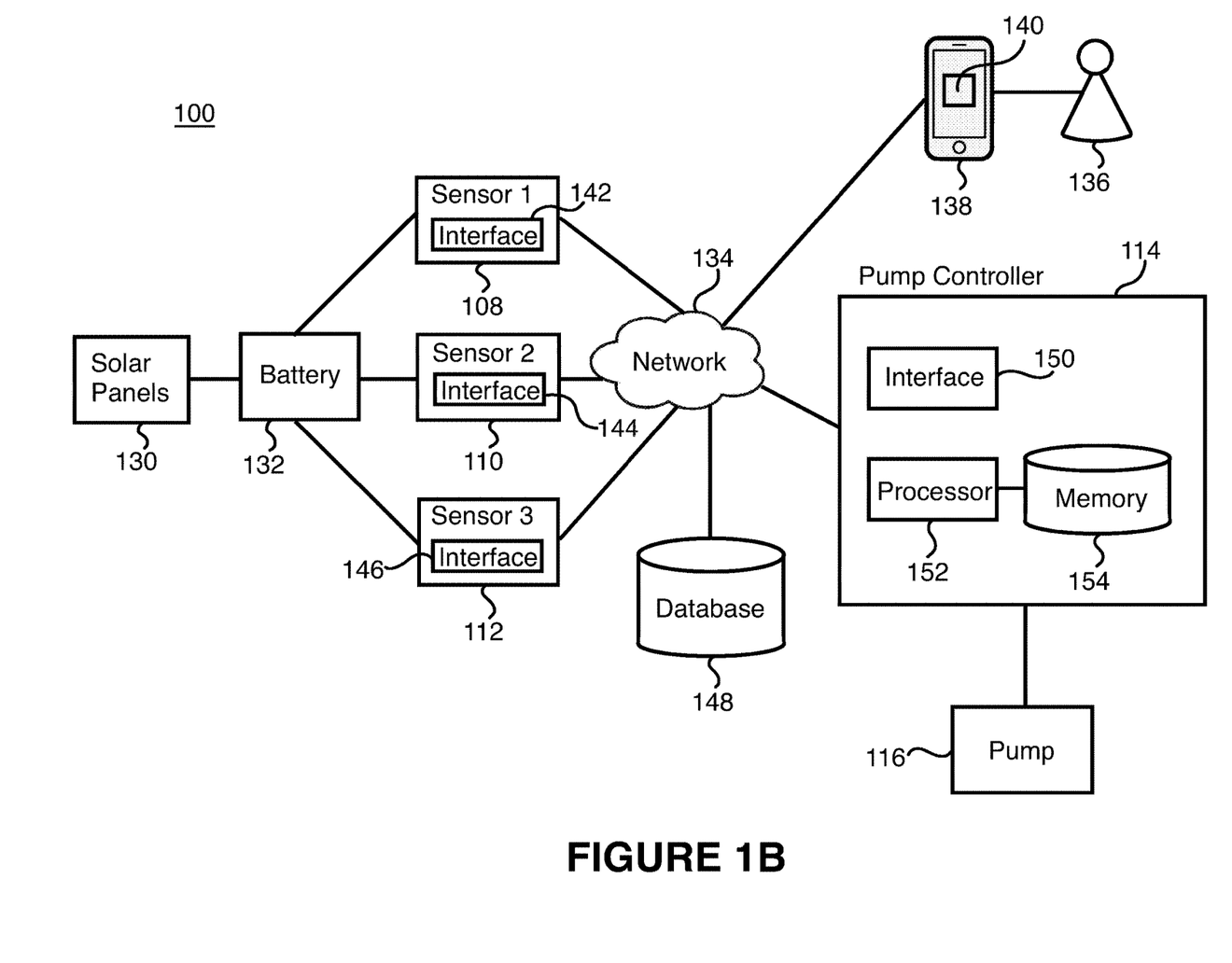

FIGS. 1A and 1B illustrate an example rooftop water tank system 100. FIG. 1A illustrates certain components of the system as installed, and FIG. 1B illustrates the connections and/or interactions that may exist amongst components. As illustrated in FIG. 1A, system 100 includes a building 102, a rooftop water tank 104, a structure 106 which attaches to and fits inside water tank 104, a first sensor 108 that is coupled to structure 106, a second sensor 110 that is coupled to structure 106, a third sensor 112, a controller 114, a water pump 116, an electrical outlet box 128, and solar panels 130. Generally, first sensor 108 and second sensor 110 communicate information about the water level in water tank 104 to controller 114, which uses this information to control the operation of pump 116. As an example, in response to receiving an indication from first sensor 108 that the water level of water 126 within tank 104 has reached and/or risen past a maximum fill level, controller 114 may deactivate pump 116. As another example, in response to receiving an indication from second sensor 110 that the water level of water 126 within tank 104 has fallen below a minimum fill level, controller 114 may activate pump 116.

As illustrated in FIG. 1A, rooftop water tank 104 is located on roof 103 of building 102. Building 102 is any building that uses tank 104 to provide the building with all or a portion of its water supply. For example, building 102 may be a single-family home, a townhouse, an office building, an apartment building, and/or any other suitable building. In certain embodiments, all of the water delivered to house 102 through faucets and/or other point of use outlets originates from tank 104. In some embodiments, tank 104 may provide a portion of the total water supplied to building 102. For example, tank 104 may act as a backup and/or supplemental water supply for building 102. While illustrated in FIG. 1A as sitting directly on top of roof 103, tank 104 may be positioned anywhere on or near building 102, provided that the vertical elevation of tank 104 is greater than each of the vertical elevations of the outlet points within house 102, to which water from tank 104 is to be delivered. For example, in certain embodiments, tank 104 may be positioned on top of a tower located beside building 102.

Rooftop water tank 104 stores water 126 for use within building 102. As illustrated in FIG. 1A, tank 104 includes a water inlet location 105*a* and a water outlet location 105*b*. Water 126 is delivered to tank 104 through inlet location 105*a* by pipe 122. Water 126 leaves tank 104 and enters home 102 through outlet location 105*b*. For example, outlet location 105*b* may be connected to water pipes within building 102. When an individual within building 102 opens a faucet, water 126 flows from tank 104, through outlet location 105*b*, into the water pipes within building 102, and to the open faucet, as a result of gravity and the fact that tank 104 is at a higher vertical elevation that the piping within building 102. Water tank 104 may be any suitable vessel for receiving water from pipe 122, storing water, and delivering water to point of use outlets within building 102. For example, while illustrated in FIG. 1A as cylindrical in nature, tank 104 may be any suitable geometry for storing water 126. In certain embodiments, water tank 104 is an existing water tank that was previously installed on building 102. For example, water tank 104 may be a water tank that was previously used in a system that included a light switch installed on building 102 for manually activating/deactivating a pump (e.g., pump 116) that was used to deliver water to tank 104.

Sensor 108 and sensor 110 are water sensors that are located inside of water tank 104. Sensor 108 is placed at a vertical position within tank 104 corresponding to a desired maximum fill level of tank 104. This maximum fill level may be chosen as any suitable vertical position within tank 104. As an example, in certain embodiments, sensor 108 is placed at or immediately below the upper edge 107 of tank 104, indicating that tank 104 should be filled to capacity each time the tank is filled/refilled with water. As another example, in certain embodiments, sensor 108 is placed at a vertical position a certain distance below the upper edge 107 of tank 104, indicating that tank 104 should not be filled to capacity each time the tank is filled/refilled with water. This may be desirable to help prevent water from overflowing out of tank 104. For example, placing the maximum fill level of tank 104 below upper edge 107 of tank 104 may provide a tolerance for any communication delays between sensor 108 and controller 114 and/or controller 114 and pump 116. Placing the maximum fill level of tank 104 below upper edge 107 may also allow for tank 104 to be used to collect rainwater. For example, even if tank 104 is filled during and/or shortly before a rainstorm, provided that the tank was filled to a maximum fill level that is below outer edge 107, tank 104 may be able to capture and store a portion of the rainwater.

Sensor 108 is configured to detect when the water level within tank 104 reaches and/or rises above the maximum fill level (e.g., the vertical position of sensor 108 within tank 104). In response to such a detection, sensor 108 is configured to transmit an indication that the water level within tank 104 has reached the maximum fill level to controller 114. Sensor 108 may be any suitable sensor configured to detect the presence of water. For example, sensor 108 may be a sensor configured to detect a difference between the resistance, conductance, capacitance, or ability to transmit a signal between air and water. As a specific example, in certain embodiments, sensor 108 includes one or more pairs of electrodes that complete a circuit within the sensor when wet (e.g., when the electrodes in each pair of electrodes are connected to one another via a water bridge).

The indication that is transmitted by sensor 108 to controller 114, indicating that the water level within tank 104 has reached the maximum fill level, may be any suitable indication. As an example, in certain embodiments, sensor 108 is configured to transmit a signal to controller 114 when sensor 108 is wet and/or immersed in water. For example, in embodiments in which sensor 108 includes one or more pairs of electrodes that complete a circuit within the sensor when the electrodes within each pair are connected to one another via a water bridge, this circuit may be configured to generate a signal that is transmitted to controller 114. In such embodiments, the transmission of the signal corresponds to the indication. As another example, in certain embodiments, when sensor 108 is not immersed in water, the sensor may be configured to continuously (or at regular intervals) communicate with controller 114. On the other hand, when sensor 108 is immersed in water, the sensor may refrain from transmitting such communications. For example, in embodiments in which sensor 108 includes one or more pairs of electrodes that complete a circuit within the sensor when the electrodes within each pair are connected to one another via a water bridge, this circuit may be configured to prevent the transmission of the communications to controller 114. In such embodiments, the absence of the transmission of the communications to controller 114 corresponds to the indication.

Sensor 110 is placed at a vertical position within tank 104 corresponding to a desired minimum fill level for tank 104. This minimum fill level may be chosen as any suitable vertical position within tank 104, lower than the position of sensor 108, which is associated with the maximum fill level of tank 104. As an example, in certain embodiments, sensor 108 is placed at or immediately above the bottom of tank 104, indicating that tank 104 should be filled when tank 104 is empty or almost empty of water 126. As another example, in certain embodiments, sensor 108 is placed at a vertical position a certain distance above the bottom of tank 104 (e.g., halfway up tank 104), indicating that tank 104 should be filled even when a (potentially substantial) portion of water 126 remains in tank 104. This may be desirable to help maintain water pressure within building 102.

Sensor 110 is configured to detect when the water level within tank 104 falls below the minimum fill level (e.g., the vertical position of sensor 110 within tank 104). In response to such a detection, sensor 110 is configured to transmit an indication that the water level within tank 104 has fallen below the minimum fill level to controller 114. Sensor 110 may be any suitable sensor configured to detect the presence of water. For example, sensor 110 may be a sensor configured to detect a difference between the resistance, conductance, capacitance, or ability to transmit a signal between air and water. As a specific example, in certain embodiments, sensor 110 includes one or more pairs of electrodes that complete a circuit within the sensor when wet and/or immersed in water (e.g., when the electrodes in each pair of electrodes are connected to one another via a water bridge).

The indication that is transmitted by sensor 110 to controller 114, indicating that the water level within tank 104 has fallen below the minimum fill level, may be any suitable indication. As an example, in certain embodiments, sensor 110 is configured to transmit a signal to controller 114 when sensor 110 is dry and/or not immersed in water. For example, in embodiments in which sensor 110 includes one or more pairs of electrodes that complete a circuit within the sensor when the electrodes within each pair are connected to one another via a water bridge, the sensor may be configured to generate a signal that is transmitted to controller 114 when the circuit is open. In such embodiments, the transmission of the signal corresponds to the indication. As another example, in certain embodiments, when sensor 110 is immersed in water, the sensor may be configured to continuously (or at regular intervals) communicate with controller 114. On the other hand, when sensor 110 is dry and/or not immersed in water, the sensor may refrain from transmitting such communications. For example, in embodiments in which sensor 110 includes one or more pairs of electrodes that complete a circuit within the sensor when the electrodes within each pair are connected to one another via a water bridge, this circuit may be configured to generate the communications for transmission to controller 114. In such embodiments, the absence of the transmission of the communications to controller 114 corresponds to the indication.

Sensor 108 and sensor 110 may be mounted inside and/or attached to water tank 104 in any suitable manner. As an example, in certain embodiments, sensor 108 and/or sensor 110 may be attached directly to the inner wall of tank 104. Sensor 108 and/or sensor 110 may be attached directly to the inner wall of tank 104 in any suitable manner. For example, sensor 108 and/or sensor 110 may be attached permanently, semi-permanently, and/or removably to the inner wall of tank 104. As a specific example, sensor 108 and/or sensor 110 may be attached directly to the inner wall of tank 104 using adhesive. As another specific example, in embodiments where tank 104 is formed from a ferromagnetic material, sensor 108 and/or sensor 110 may include magnets configured to attract the wall of tank 104. As a further specific example, in certain embodiments, sensor 108 and/or sensor 110 may include a pair of magnets—a first magnet attached directly to the sensor and configured to rest against the inner wall of tank 104 and a second magnet configured to rest against the outer wall of tank 104 and to attract the first magnet through the wall.

As another example of the manner by which sensor 108 and/or sensor 110 may be mounted inside/attached to water tank 104, in certain embodiments, and as illustrated in FIG. 1A, sensor 108 and sensor 110 are coupled to a structure 106 that is designed to attach to tank 104 and rest all or partly inside of tank 104. Structure 106 may attach to tank 104 in any suitable manner. For example, structure 106 may be permanently, semi-permanently, and/or removably attached to tank 104. As a specific example, structure 106 may be welded to the inner wall of tank 104, and/or attached to the inner wall of tank 104 using adhesive. As another specific example, and as illustrated in FIG. 1A, in certain embodiments, structure 106 is a pole with a hook or other attachment device on one end, which is configured to engage the rim 107 of tank 104. This may be desirable in embodiments in which tank 104 is an existing water tank. In such embodiments, adding sensors 108/110 inside of water tank 104 may be as simple as inserting structure 106 into tank 104, and securing structure 106 to tank 104 by engaging the hook or other attachment device of structure 106 to rim 107 of tank 104. Further details of this embodiment of structure 106 are presented below, in the discussion of FIG. 2B.

Once installed, the vertical positions of sensor 108 and/or sensor 110 may be fixed or adjustable within tank 104. In embodiments in which the vertical positions of sensor 108 and/or sensor 110 are adjustable within tank 104, in certain embodiments, the vertical position of sensor 108 may be adjusted independently of the vertical position of sensor 110, and vice versa. In some embodiments, an adjustment of the vertical position of sensor 108 may also adjust the vertical position of sensor 110 and vice versa. As an example of a manner by which the vertical position of sensor 108 and/or sensor 110 may be adjusted, in certain embodiments in which sensors 108/110 are attached to the inner wall of tank 104 using magnets, the positions of these magnets may be adjusted on the tank wall. As another example, in certain embodiments in which sensors 108/110 are coupled to a structure 106 that is attached to tank 104, the positions of sensor 108 and/or sensor 110 may be adjustable on structure 106. For example, in certain embodiments, structure 106 may include a telescoping pole which may be expanded/contracted to adjust the positions of sensor 108 and/or sensor 110 on structure 106. Further details of an embodiment of structure 106 that includes a telescoping pole are presented below, in the discussion of FIG. 2B.

While FIGS. 1A and 1B illustrate a pair of sensors 108 and 110 that provide information about the water level inside tank 104 to controller 114, in certain embodiments, system 100 may include a single sensor 108. As an example, sensor 108 may be an ultrasonic sensor configured to transmit information about the water level within tank 104 to controller 114 at regular intervals. As another example, sensor 108 may be an ultrasonic sensor configured to determine the water level within tank 104 at regular intervals and to determine whether this level is (1) at or below a minimum fill level, or (2) at or above a maximum fill level. In response to determining that the water level inside tank 104 is at or below the minimum fill level, sensor 108 may be configured to transmit a signal of a first type to controller 114. In response to determining that the water level inside tank 104 is at or above the maximum fill level, sensor 108 may be configured to transmit a signal of a second type to controller 114.

In addition to sensor 108 and sensor 110, both of which are configured to communicate information about the water level within tank 104 to controller 114, system 100 may include any number of other sensors, which may be used for any suitable purposes. For example, in certain embodiments, and as illustrated in FIG. 1A, system 100 includes water flow sensor 112. In certain embodiments, water flow sensor 112 is positioned at water inlet location 105a, as illustrated in FIG. 1A, to measure the amount of water flowing through pipe 122 and into tank 104. In some embodiments, a water flow sensor may be positioned at water outlet location 105b, to measure the amount of water flowing into building 102. Water flow sensor 112 may be any sensor capable of measuring an amount of water flowing into or out of tank 104. As an example, in certain embodiments, water flow sensor 112 includes a valve body, a water rotor, and a hall-effect sensor. The valve body may be inserted into inlet location 105*a* and/or outlet location 105*b*. When water flows through the rotor, the water rotates the rotor at a speed dependent on the rate of flow of the water. This rotation induces a voltage which is measured by the hall effect sensor. The hall effect sensor may output a signal with each rotation of the rotor. These signals may be converting into an amount of water flowing through the sensor over time. In certain embodiments, sensor 112 transmits the signals generated by the hall effect sensor to controller 114 and controller 114 coverts these signals into an amount of water flowing into and/or out of tank 104 over time. In some embodiments, sensor 112 itself converts the signals into an amount of water flowing into and/or out of tank 104 over time and transmits this amount to controller 114. Sensor 112 may be easily added to an existing water tank 104. For example, in embodiments in which sensor 112 is placed in water inlet location 105*a*, sensor 112 may be added to tank 104 by reaching inside tank 104 from the top of the tank and inserting sensor 112 into water inlet location 105*a*.

Sensor 108, sensor 110, and/or sensor 112 may be configured to communicate with controller 114 in any suitable manner. As an example, in certain embodiments, sensor 108/110/112 communicates with controller 114 over a wired connection between the sensor and controller 114. In such embodiments, the wires connecting sensor 108/110/112 to controller 114 may run inside building 102 and/or along the outside of building 102. As another example, in certain embodiments, sensor 108/110/112 communicates with controller 114 over a wireless connection. For example, as illustrated in FIG. 1B, sensor 108 may include interface 142 through which sensor 108 may communicate wirelessly with controller 114, sensor 110 may include interface 144 through which sensor 110 may communicate wirelessly with controller 114, and/or sensor 112 may include interface 146 through which sensor 112 may communicate wirelessly with controller 114. Each of sensor 108, sensor 110, and/or sensor 112 may be configured to communicate wirelessly with controller 114 using any suitable wireless communication technology. As an example, in certain embodiments, one or more of sensor 108, sensor 110, and/or sensor 112 communicates wirelessly with controller 114 over a WiFi network 134. As another example, in certain embodiments, one or more of sensor 108, sensor 110, and/or sensor 112 communicates wirelessly with controller 114 over a Bluetooth network 134.

Each of interface 142, interface 144, and interface 146 represents any suitable device operable to receive information from network 134, transmit information through network 134, perform suitable processing of the information, communicate to other devices, or any combination of the preceding. As an example, in certain embodiments, one or more of interface 142, interface 144, and interface 146 transmits signals to pump controller 114. Each of interface 142, interface 144, and interface 146 represents any port or connection, real or virtual, including any suitable hardware and/or software, including protocol conversion and data processing capabilities, to communicate through a LAN, WAN, or other communication systems that allows first sensor 108, second sensor 110, and third sensor 112, respectively, to exchange information with pump controller 114 and/or other components of system 100 via network 134.

Network 134 facilitates communication between and amongst the various components of system 100. This disclosure contemplates network 134 being any suitable network operable to facilitate communication between such components. Network 134 may include any interconnecting system capable of transmitting audio, video, signals, data, messages, or any combination of the preceding. Network 134 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Sensor 108, sensor 110, and/or sensor 112 may be powered in any suitable manner. As an example, in certain embodiments, one or more of sensor 108, sensor 110, and sensor 112 is powered by electricity from building 102. For example, sensor 108, sensor 110, and/or sensor 112 may be connected to the main power supply of building 102 by wiring. As another example, in certain embodiments, one or more of sensor 108, sensor 110, and/or sensor 112 is connected to and powered by a battery 132 (as illustrated in FIG. 1B). In certain embodiments, battery 132 is a rechargeable battery. In such embodiments, battery 132 may be recharged in any suitable manner. For example, battery 132 may be recharged using: (1) one or more solar panels 130 that have been installed on building 102; (2) the main power supply of building 102; (3) a combination of electricity generated by solar panel 130 and electricity from the main power supply of building 102; or (4) any other power source. As a further example, in certain embodiments, one or more of sensor 108, sensor 110, and sensor 112 is connected directly to and powered directly by solar panel 130.

Pump controller 114 is located on or near building 104 and controls the operation of pump 116, based on information received from sensor 108 and/or sensor 110. As example, and as illustrated in FIG. 1A, in certain embodiments, pump controller 114 is installed on a wall of building 102. For instance, pump controller 114 may be designed to fit within a standard electrical outlet box 128, as described in further detail below, in the discussion of FIG. 2A. In this manner, an prior system that included a light switch control that was used to manually activate/deactivate pump 116 may easily be upgraded to the system of the present disclosure by removing the light switch from electrical outlet box 128 and replacing it with pump controller 114. As another example, in certain embodiments, pump controller 114 may be installed on pump 116. For example, in some embodiments, pump controller 114 may be integrated into pump 116 (e.g., pump 116 may be manufactured to include pump controller 114). In some embodiments, pump controller 114 may be installed on the outside of pump 116. For example, pump controller 114 may be installed inside weatherproof casing 118 that is mounted on pump 116.

As seen in FIG. 1B, in certain embodiments, pump controller 114 includes a processor 152 and a memory 154. This disclosure contemplates processor 152 and memory 154 being configured to perform any of the functions of controller 114 described herein. Generally, controller 114 (1) receives a first indication from sensor 110 when the water level within tank 104 falls below a minimum fill level associated with the vertical position of sensor 110 within tank 104; (2) in response to receiving this first indication, generates a signal to activate pump 116; (3) receives a second indication from sensor 108 when the water level within tank 104 reaches and/or rises above a maximum fill level associated with the vertical position of sensor 108 within tank 104; and/or (4) in response to receiving this second indication, generates a signal to deactivate pump 116. In certain embodiments, pump controller 116 receives data from sensor 112, which indicates the amount of water entering tank 104 over time and/or the amount of water leaving tank 104 over time. In response to receiving such data from sensor 112, pump controller 114 stores this data in database 148. In some embodiments, pump controller 114 may determine the amount of water remaining in tank 104 at any given time, based on the maximum fill level of tank 104 and the amount of water leaving tank 104 over time. In some embodiments, pump controller 114 may store the determined amount of water remaining in tank 104 over time in database 148. In some embodiments, pump controller 114 receives requests from a user device 138. For example, pump controller 114 may receive a request to: (1) provide device 138 with the amount of water entering tank 104 over time and/or the amount of water leaving tank 104 over time; (2) provide device 138 with the amount of water remaining in tank 104; (3) activate pump 116; and/or (4) deactivate pump 116. In response to receiving the request from user device 138, pump controller 114 is configured to perform the requested action.

Processor 152 is any electronic circuitry, including, but not limited to computer processing units (CPUs), graphics processing units (GPUs), microprocessors, application specific integrated circuits (ASIC), application specific instruction set processor (ASIP), and/or state machines, that communicatively couples to memory 154 and controls the operation of pump controller 114. Processor 152 may be 8-bit, 16-bit, 32-bit, 64-bit or of any other suitable architecture. Processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 152 may include other hardware and software that operates to control and process information. Processor 152 executes software stored on memory 154 to perform any of the functions described herein. Processor 152 controls the operation and administration of pump controller 114 by processing information received from sensor 108, sensor 110, sensor 112, pump 116, network 134, user device 138, database 148, interface 150, and/or memory 154. Processor 152 may be a programmable logic device, a microcontroller, a microprocessor, any suitable processing device, or any suitable combination of the preceding. Processor 152 is not limited to a single processing device and may encompass multiple processing devices.

Memory 154 may store, either permanently or temporarily, data, operational software, or other information for processor 152. Memory 154 may include any one or a combination of volatile or non-volatile local or remote devices suitable for storing information. For example, memory 154 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 154, a disk, a CD, or a flash drive. In particular embodiments, the software may include an application executable by processor 152 to perform one or more of the functions described herein.

Interface 150 represents any suitable device operable to receive information from network 134, transmit information through network 134, perform suitable processing of the information, communicate to other devices, or any combination of the preceding. As an example, in certain embodiments, interface 150 receives signals from sensor 108, sensor 110, and/or sensor 112. As another example, in certain embodiments, interface 150 transmits signals to pump 116. As another example, in certain embodiments, interface 150 sends data to database 148 for storage and/or receives data from database 148. As a further example, in certain embodiments, interface 150 sends messages to and/or receives messages from device 138. Interface 150 represents any port or connection, real or virtual, including any suitable hardware and/or software, including protocol conversion and data processing capabilities, to communicate through a LAN, WAN, or other communication systems that allows pump controller 114 to exchange information with sensor 108, sensor 110, sensor 112, pump 116, device 138, database 148, and/or other components of system 100 via network 134.

In certain embodiments, controller 114 corresponds to a commercially available microcomputer and/or microcontroller that has been programmed to perform the above described tasks. For example, controller 114 may correspond to an Arduino Uno, a Raspberry Pi, a Huawei HiKey960, an ODroid-XU4, a BeagleBone Black, an Asus Tinker Board, an Imagination Creator Ci20, a BBC Micro Bit, a C.H.I.P, and/or any other commercially available microcomputer and/or microcontroller.

As described above, controller 114 is used to control the operation of pump 116. Pump 116 is any pump configured to deliver water 124 to tank 104 through pipe 122. Pipe 122 is any pipe suitable for carrying water to tank 104. For example, pipe 122 may be a plastic pipe, a metal pipe, or a pipe formed from any other suitable material. Pump 116 may deliver water 124 stored in any location to tank 104. For example, in certain embodiments, pump 116 is configured to deliver water 124 that is stored in a well to tank 104.

Pump controller 114 may communicate with pump 116 in any suitable manner. As an example, pump controller 114 may communicate with pump 116 through a wired connection 120. For example, in certain embodiments in which pump controller 114 is designed to replace a light switch control of an existing water supply system that was used to manually activate/deactivate pump 116, pump controller 114 may communicate with pump 116 using the same wired connection 120 that the light switch controller used for communication with pump 116. As another example, in certain embodiments, pump controller 114 may communicate wirelessly (e.g., using WiFi and/or Bluetooth) with pump 116 using network 134.

As illustrated in FIG. 1B, in certain embodiments, system 100 includes one or more user(s) 136 and corresponding user device(s) 138. Each user 136 may use a device 138 to communicate with pump controller 114. For example, in certain embodiments, an application 140 may be installed on device 138 through which user 136 may communicate with pump controller 114. In some embodiments, application 140 includes a graphical user interface. User 136 may request and receive any suitable information from pump controller 114 for display on device 138. As an example, user 136 may use device 138 to request, receive, and display information regarding: (1) the times at which pump 116 was activated and/or deactivated; (2) the duration of time for which pump 116 was activated; (3) the amount of water that entered tank 104 over time; (4) the amount of water that exited tank 104 over time; (5) the amount of water remaining in tank 104; and/or (6) any other suitable information. As another example, user 136 may use device 138 to override sensor 108 and/or sensor 110. For example, user 136 may use device 138 to instruct controller 114 to activate pump 116 for a certain period of time, and/or to deactivate pump 116 for a certain period of time. User 136 may desire to instruct controller 114 to activate pump 116 for a certain period of time where user 136 knows that the maximum fill level is set at a low level within tank 104 and user 136 wishes to fill tank 104 higher than this level because he/she knows that he/she is about to consume a large quantity of water. User 136 may desire to instruct controller 114 to deactivate pump 116 for a certain period of time where user 136 knows that the occupants of building 102 will be absent for the period of time, such that it does not matter whether the water in tank 104 falls below the minimum fill level.

Device 138 includes any appropriate device for communicating with components of system 100 over network 134. For example, device 138 may be a telephone, a mobile phone, a computer, a laptop, a wireless or cellular telephone, a tablet, a server, and IoT device, and/or an automated assistant, among others. This disclosure contemplates device 138 being any appropriate device for sending and receiving communications over network 134. Device 138 may also include a user interface, such as a display, a microphone, keypad, or other appropriate terminal equipment usable by a user 136. In some embodiments, an application executed by a processor of device 138 may perform the functions described herein.

In certain embodiments, system 100 may include database 148. While illustrated in FIG. 1B as separate from pump controller 114, in certain embodiments, database 148 is stored in memory 154 of pump controller 114. Database 148 is configured to store any suitable information relating to system 100. For example, in certain embodiments, database 148 stores information received from pump controller 114 that may be requested by device 138, for display to user 136. This information may include: (1) the times at which pump 116 was activated and/or deactivated; (2) the duration of time for which pump 116 was activated; (3) the amount of water that entered tank 104 over time; (4) the amount of water that exited tank 104 over time; (5) the amount of water remaining in tank 104; and/or (6) any other suitable information.

In certain embodiments, system 100 may include one or more protection features to safeguard against failures of any of sensor 108, sensor 110, and/or pump 116. For example, pump controller 114 may be configured to generate an alert in response to determining that any of sensor 108, sensor 110, and/or pump 116 has failed. Pump controller 114 may determine that one or more of sensor 108, sensor 110, and pump 116 has failed based on information received from sensor 108, sensor 110, and/or pump 116. As an example, in certain embodiments, controller 114 may determine that sensor 108 and/or sensor 110 has failed, where controller 114 receives contemporaneous signals from sensor 108 and sensor 110 indicating both that the water level within tank 104 has fallen below a minimum fill level and that the water level within tank 104 has reached and/or risen above a maximum fill level. As another example, in certain embodiments, controller 114 may determine that sensor 108 and/or sensor 110 has likely failed, where controller 114 receives a signal from sensor 110 indicating that the water level in tank 104 has fallen below a minimum fill level while pump 116 is currently activated. As another example, in certain embodiments, controller 114 may determine that sensor 108 has failed, where pump 116 has been activated for longer than a certain amount of time. As a further example, controller 114 may determine that pump 116 has failed, where controller 114 has transmitted a signal to pump 116 to deactivate/activate the pump, and pump 116 failed to deactivate/activate in response.

Controller 114 may generate any suitable alerts in response to such determinations. As an example, in certain embodiments, controller 114 may transmit a message to user device 138, alerting user 136 to the potential failure. As another example, in certain embodiments, controller 114 may be equipped with a speaker or other audio outputting device and may emit an audio alarm signal in response to determining that a component of system 100 likely failed. As a further example, in certain embodiments, controller 114 may be equipped with a flare gun, which controller 114 may fire in response to determining that a component of system 100 has likely failed. In certain embodiments, controller 114 may use different alerts based on a level of severity associated with the determined failure. As an example, in response to transmitting a signal to pump 116 in order to deactivate the pump and determining that pump 116 failed to deactivate, controller 114 may generate a different type of alert based on the period of time that has passed since instructing pump 116 to deactivate. For example, after 1 minute has passed and pump 116 has failed to deactivate, pump controller 114 may transmit an alert to mobile device 138. After 30 minutes have passed and pump 116 has failed to deactivate, pump controller 114 may emit an audio alarm signal. After 2 hours have passed and pump 116 has failed to deactivate, pump controller 114 may fire a flare gun.

Modifications, additions, or omissions may be made to the systems described herein without departing from the scope of the invention. For example, system 100 may include any number of sensors 108, 110, and/or 112, structures 106, controllers 114, pumps 116, pipes 122, solar panels 130, batteries 132, networks 134, users 136, devices 138, and/or databases 148. The components may be integrated or separated. Moreover, the operations may be performed by more, fewer, or other components. Additionally, the operations may be performed using any suitable logic comprising software, hardware, and/or other logic.

Figure 2A:
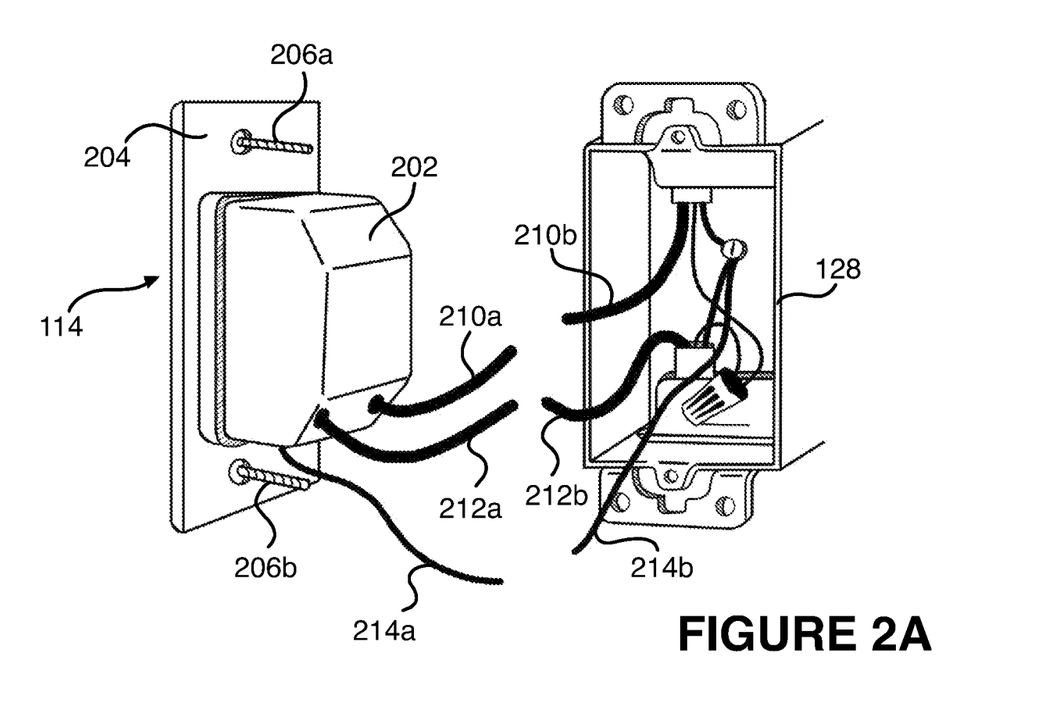
FIG. 2A illustrates an example controller of the water supply system of FIGS. 1A and 1B, which is configured to fit within an electrical outlet box and to control a water pump that is used to supply a rooftop water tank with water.

FIG. 2A presents an example pump controller 114. As illustrated in FIG. 2A, pump controller 114 is configured to fit within electrical outlet box 128. This may be desirable to provide a simple and cheap way by which existing water tank supply systems, such as those found in Bangladesh may be upgraded. These existing systems typically use a manual control in the form of a light switch mounted on building 102 to manually activate/deactivate pump 116. For example, pump 116 may be manually activated by switching the light switch to the on position, and pump 116 may be manually deactivated by switching the light switch to the off position. By designing pump controller 114 to fit within electrical outlet box 128, this disclosure contemplates that anyone capable of installing/uninstalling a light switch may install pump controller 114. For example, installing pump controller 114 in electrical outlet box 128 is as simple as (1) removing the connections between the light switch and wires 210b, 212b, and 214b, and (2) installing pump controller 114 in electrical outlet box 128 by connecting each wire 210a, 212a, and 214a of pump controller 114 to the corresponding wires 210b, 212b, and 214b in electrical outlet box 128. While FIG. 2A illustrates an embodiment where the installation of pump controller 114 includes connecting three wires wire from pump controller 114 to three wires within electrical outlet box 128, this disclosure contemplates that installing pump controller 114 in system 100 may include connecting any number of wires from pump controller 114 to wires within electrical outlet box 128.

As illustrated in FIG. 2A, in certain embodiments, pump controller 114 includes a casing 202, designed to fit within electrical outlet box 128, and a cover plate 204. All of the circuitry and/or other components associated with the functionality of pump controller 114 may be housed within casing 202. Cover plate 204 may be configured to cover electrical outlet box 128, such that no portion of electrical outlet box is exposed to the elements. In certain embodiments, cover plate 204 may be secured to electrical outlet box 128 using a pair of screws 206a and 206b.

Figure 2B:
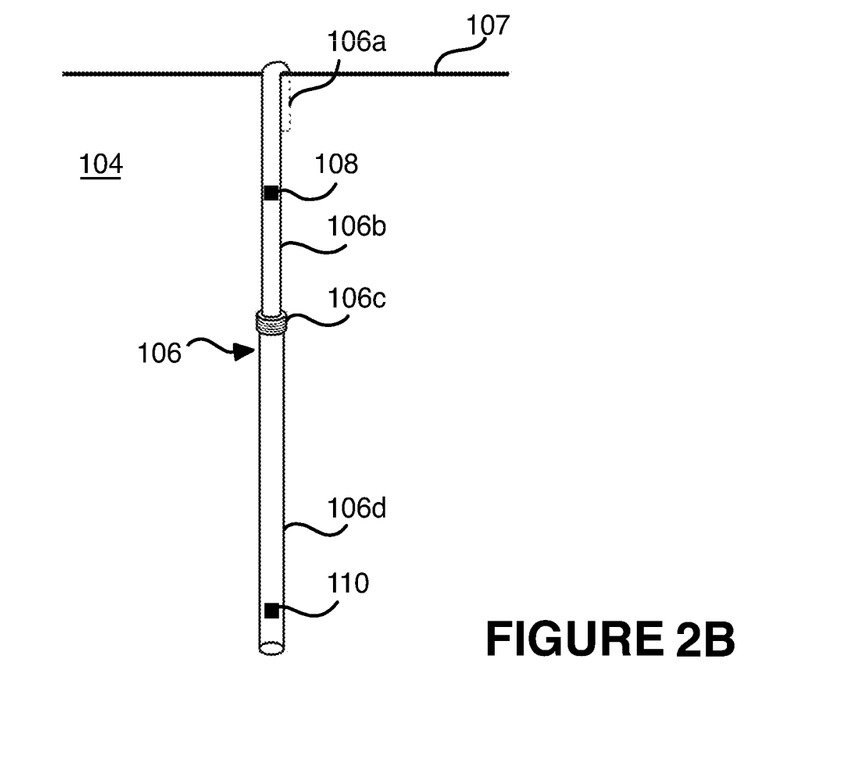
FIG. 2B illustrates an example structure that includes a pair of water sensors and is configured to affix to the rooftop water tank of the system of FIGS. 1A and 1B and to alert the controller of FIG. 2A when the water level in the rooftop water tank falls below a first level or rises above a rise level.

FIG. 2B illustrates an example structure 106 that is used to place a pair of water sensors 108 and 110 inside rooftop water tank 104. As illustrated in FIG. 2B, in certain embodiments, structure 106 is a pole with an attachment portion 106a at one end. Attachment portion 106a is configured to engage with rim 107 of water tank 104 in order to hold a portion of structure 106 that includes sensor 108 and sensor 110 within tank 104. As illustrated in FIG. 2B, in certain embodiments, attachment portion 106a is a hook. In some embodiments, attachment portion 106a is a clip or other attachment device.

In certain embodiments, the position of sensor 108 and/or the position of sensor 110 on structure 106 is adjustable. For example, as illustrated in FIG. 2B, structure 106 may include a telescoping pole that includes one or more pairs of telescoping parts. For instance, structure 106 may include a first part 106b in a telescoping relationship with a second part 106d. First part 106b is configured to be slidably received within second part 106d. As illustrated in FIG. 2B, the position of sensor 110 within tank 104 may be adjusted by varying the portion of first part 106b that is received within second part 106d. Once sensor 110 has been adjusted to a desired position, the portion of first part 106b within second part 106d may be locked in place using locking mechanism 106c. Locking mechanism 106c may be any suitable mechanism operable to secure a given portion of first part 106b within second part 106d. For example, locking mechanism 106c may be configured to tighten around first part 106b to prevent first part 106b from moving relative to second part 106d. While illustrated, for simplicity, in FIG. 2B as including two telescoping parts—106b and 106d—structure 106 may include any number of telescoping parts. For example, first part 106b may include a pair of telescoping parts—a first telescoping part on which sensor 108 is attached and a second telescoping part above sensor 108 (as viewed when structure 106 is installed within tank 104), that is configured to be slidably received within the first telescoping part. Such a pair of telescoping parts may be used to adjust the position of sensor 108 within tank 104.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
    a pole with a hook at one end, the hook operable to attach to a rim of a water tank, the water tank configured to supply a building with water;
    a first sensor coupled to the pole, the first sensor configured to determine that a water level in the water tank has fallen below a first level, wherein the first sensor is adjustable to different vertical positions within the water tank by adjusting the first sensor's position on the pole, and wherein the first sensor comprises a pair of electrodes that complete a circuit within the sensor when the electrodes are in contact with water;
    a second sensor coupled to the pole, the second sensor configured to determine that the water level in the water tank has risen to at least a second level wherein the second sensor is adjustable to different vertical positions within the water tank by adjusting the second sensor's position on the pole, and wherein the second sensor comprises a pair of electrodes that complete a circuit within the sensor when the electrodes are in contact with water;
    wherein the couplings between the first sensor and the pole and the coupling between the second sensor and the pole are adjustable to different vertical positions on the pole;
    a third sensor configured to measure at least one from the set comprising: an amount of water entering the water tank over time and an amount of water leaving the water tank over time;
    a database stored in a memory;
    an interface comprising an application running on a mobile communication device, the interface configured to:
        receive input from a user and communicate the input to a controller; and
        display output from the controller to the user; and the controller configured to:
fit within and couple to an electrical outlet box; and
communicate wirelessly with a pump configured to deliver water to the water tank, the controller comprising a hardware processor, the hardware processor communicatively coupled to the first sensor, the second sensor, and the third sensor, and configured to:
receive, from the first sensor, a first indication that the water level has fallen below the first level, wherein the first sensor is configured to communicate with the controller continuously when the circuit of the first sensor is not complete, and wherein the first indication is the communication from the first sensor;
in response to receiving the first indication that the water level has fallen below the first level, generate a first signal to activate the pump;
receive, from the second sensor, a second indication that the water level has risen to at least the second level, wherein the second sensor is configured to communicate with the controller continuously when the circuit of the second sensor is not complete and to not communicate with the controller when the circuit of the second sensor is complete and wherein the second indication is an absence of communication from the second sensor;
in response to receiving the second indication that the water level has risen to at least the second level, generate a second signal to deactivate the pump;
receive data from the third sensor, the data associated with at least one of the amount of water entering the water tank over time and the amount of water leaving the water tank over time;
in response to receiving the data from the third sensor, store the received data from the third sensor in the database in the memory;
receive a first communication from the interface, the first communication comprising a request for information comprising at least one of: the amount of water entering the water tank over time, the amount of water leaving the water tank over time, and an amount of water remaining in the tank;
in response to receiving the first communication from the interface, transmit the information to the interface, wherein in response to receiving the information, the interface is configured to display the information;
receive a second communication from the interface, the second communication comprising at least one of: a request to turn the pump on and a request to turn the pump off; and
in response to receiving the second communication from the interface, generate at least one of:
a third signal to deactivate the pump, wherein the second communication comprised the request to turn the pump off; and
a fourth signal to activate the pump, wherein the second communication comprised the request to turn the pump on.

2. A system comprising:
a first sensor operable to attach to a water tank, the water tank configured to supply a building with water, the first sensor configured to determine that a water level in the water tank has fallen below a first level, wherein the first sensor is adjustable to different vertical positions within the water tank and wherein the first sensor comprises a pair of electrodes that complete a circuit within the sensor when the electrodes are connected by water;
a second sensor operable to attach to the water tank, the second sensor configured to determine that the water level in the water tank has risen to at least a second level, wherein the second sensor is adjustable to different vertical positions within the water tank and wherein the second sensor comprises a pair of electrodes that complete a circuit within the sensor when the electrodes are connected by water; and
a controller comprising a hardware processor, the hardware processor communicatively coupled to the first sensor and the second sensor, and configured to:
receive, from the first sensor, a first indication that the water level has fallen below the first level, wherein the first sensor is configured to communicate with the controller continuously when the circuit of the first sensor is not complete, and wherein the first indication is the communication from the first sensor; and
in response to receiving the first indication that the water level has fallen below the first level, generate a first signal to activate a pump configured to deliver water to the water tank;
receive, from the second sensor, a second indication that the water level has risen to at least the second level, wherein the second sensor is configured to communicate with the controller continuously when the circuit of the second sensor is not complete and to not communicate with the controller when the circuit of the second sensor is complete and wherein the second indication is an absence of communication from the second sensor; and
in response to receiving the second indication that the water level has risen to at least the second level, generate a second signal to deactivate the pump.

3. The system of claim 2, wherein the first sensor and the second sensor are configured to communicate wirelessly with the controller.

4. The system of claim 3, wherein the first sensor and the second sensor are configured to communicate with the controller using at least one from the set comprising Bluetooth and WiFi.

5. The system of claim 2, further comprising at least one solar panel.

6. The system of claim 2, wherein the controller is configured to fit within and couple to an electrical outlet box.

7. The system of claim 2, wherein the controller is configured to communicate wirelessly with the pump.

8. The system of claim 2, wherein the controller is configured to couple to the pump.

9. The system of claim 8, wherein the controller is housed within a weatherproof casing, the weatherproof casing configured to couple to the pump.

10. The system of claim 2, wherein the first sensor and second sensor are coupled to a structure, the structure configured to affix to the water tank.

11. The system of claim 10, wherein at least one from the set comprising: the structure, the first sensor, and the second sensor, is configured to adjust at least one from the set comprising: the distance between the first sensor and the top of the water tank, the distance between the second sensor and the bottom of the water tank, and the distance between the first sensor and the second sensor.

12. The system of claim 10, wherein the structure is a pole with a hook at one end operable to attach to the rim of the water tank.

13. The system of claim 12, wherein the first sensor and the second sensor are coupled to the pole such that they can be moved on the pole and adjusted to different positions on the pole.

14. The system of claim 2, further comprising a third sensor communicatively coupled to the controller and configured to measure at least one from the set comprising: the amount of water entering the water tank over time and the amount of water leaving the water tank over time.

15. The system of claim 14, further comprising:
a database stored in a memory;
the controller further configured to:
receive data from the third sensor associated with at least one of the amount of water entering the water tank over time and the amount of water leaving the water tank over time; and
store the received data from the third sensor in the database in the memory.

16. The system of claim 15, the controller configured to determine an amount of water in the water tank based at least in part on the received data from the third sensor.

17. The system of claim 16, further comprising:
an interface configured to:
receive input from a user and communicate the input to the controller; and
display output from the controller to the user.

18. The system of claim 17 wherein the interface is an application running on a mobile communication device.

19. The system of claim 18 wherein the interface is configured to perform at least one of the following:
turn the pump on;
turn the pump off;
display the amount of water entering the water tank over time;
display the amount of water leaving the water tank over time; and
display an amount of water remaining in the tank.

20. The system of claim 2, wherein the controller is one from the set comprising: Arduino Uno, Rasberry Pi, Huawei HiKey960, ODroid-XU4, BeagleBone Black, Asus Tinker Board, Imagination Creator Ci20, BBC Micro Bit, and C.H.I.P.

* * * * *